(12) United States Patent
Allen, Jr. et al.

(10) Patent No.: US 10,934,108 B1
(45) Date of Patent: Mar. 2, 2021

(54) LIFT UNIT FOR USE WITH A LOAD FORMER AND LOAD FORMER INCLUDING THE LIFT UNIT

(71) Applicant: A. G. Stacker, Inc., Weyers Cave, VA (US)

(72) Inventors: Clarence C. Allen, Jr., Mt. Crawford, VA (US); Kennedy Sullivan Larramore, Staunton, VA (US); Jerry Blosser, Crimora, VA (US); Eric Stempihar, Rockingham, VA (US); Randall Donn Senger, Mount Sidney, VA (US); Joseph Wunder, Lexington, VA (US)

(73) Assignee: A.G. STACKER INC., Weyers Cave, VA (US)

( * ) Notice: Subject to any disclaimer, the term of this patent is extended or adjusted under 35 U.S.C. 154(b) by 0 days.

(21) Appl. No.: 16/684,459

(22) Filed: Nov. 14, 2019

(51) Int. Cl.
*B65G 57/10* (2006.01)
*B65G 61/00* (2006.01)

(52) U.S. Cl.
CPC ............. *B65G 57/10* (2013.01); *B65G 61/00* (2013.01)

(58) Field of Classification Search
CPC ........ B65G 57/10; B65G 61/00; B65G 57/00; B65G 57/02; B65G 57/03; B65G 57/035; B65G 57/06
USPC ...... 414/799, 789, 790.9, 791, 791.6, 792.7, 414/792.8
See application file for complete search history.

(56) References Cited

U.S. PATENT DOCUMENTS

| | | | |
|---|---|---|---|
| 4,902,195 A * | 2/1990 | Lucas .................... | B65G 57/06 198/774.1 |
| 5,372,472 A * | 12/1994 | Winski ................ | B65G 47/086 414/789.6 |
| RE35,066 E | 10/1995 | Martin | |
| 5,540,545 A * | 7/1996 | Roberts ................ | B65G 57/245 414/792.6 |
| 6,089,819 A * | 7/2000 | Barnes .................... | B65G 57/00 414/791.6 |
| 6,568,524 B1 | 5/2003 | Cornell et al. | |
| 8,000,837 B2 * | 8/2011 | Allen ..................... | B65G 61/00 700/245 |
| 8,777,552 B2 | 7/2014 | Ward et al. | |
| 8,899,407 B2 | 12/2014 | Harrington | |
| 9,073,709 B2 * | 7/2015 | Magri ................... | B65G 57/035 |
| 9,327,920 B2 * | 5/2016 | Roth ....................... | B65G 57/03 |
| 9,475,660 B2 | 10/2016 | Batrin et al. | |
| 9,662,793 B1 | 5/2017 | Min | |

(Continued)

*Primary Examiner* — Lynn E Schwenning
(74) *Attorney, Agent, or Firm* — J-Tek Law PLLC; Jeffrey D. Tekanic; Scott T. Wakeman

(57) ABSTRACT

A load former includes a frame including a stop wall, a cookie sheet having a top surface parallel to a plane and being movable between an extended position a retracted position relative to the stop wall, and a first platform shiftable between raised and lowered positions relative to the plane. The first platform is positioned relative to the frame such that when the cookie sheet is in the extended position a first portion of the cookie sheet directly overlies the upper surface of the platform and when the cookie sheet in the retracted position no portion of the cookie sheet directly overlies the platform. Also a lift having a lift support and a second platform, the lift being movable relative to the plane and the lift platform begin extendable and retractable relative to the first platform.

9 Claims, 17 Drawing Sheets

(56) References Cited

U.S. PATENT DOCUMENTS

| | | | | |
|---|---|---|---|---|
| 2004/0191049 A1* | 9/2004 | Winkler | ................ | B65G 57/03 |
| | | | | 414/791.6 |
| 2012/0027555 A1 | 2/2012 | Germain et al. | | |
| 2015/0375945 A1* | 12/2015 | Oppici | .................. | B65G 57/03 |
| | | | | 414/789.5 |
| 2018/0229948 A1* | 8/2018 | Kollmuss | ............... | B65G 57/24 |

* cited by examiner

LIFT UNIT FOR USE WITH A LOAD FORMER AND LOAD FORMER INCLUDING THE LIFT UNIT

TECHNOLOGICAL FIELD

The present disclosure is directed to a lift unit for use with a load former and to a load former including the lift unit, and, more specifically, toward a load former having a lift unit configured to allow for the formation of double-height stacks.

BACKGROUND

Paperboard blanks can be produced by various machines including rotary die cut machines. These blanks exit the rotary die cut machine individually or a small number at a time and are then formed into small stacks or bundles in a known manner. These bundles must then be arranged into larger stacks for transport and storage. For example, through known processes, the blanks may be formed into bundles of 20. If each bundle is 24 inches long by×20 inches wide, four of these bundles can be arranged in a layer having a footprint that corresponds to the 40×48 inch surface of a standard pallet. Assuming each of the bundles is 12 inches high, four to eight of these layers can be stacked one on top of another to form a 48 inch to 96 inch tall stack on the pallet. The dimensions of a standard pallet may be discussed herein, but bundles having different dimensions and/or bundles arranged in different patterns in a layer on a pallet having different dimensions can also be formed.

While the stacks could be formed completely manually, that is, by having a human worker placing each of the bundles on a pallet in a pattern and then stack additional bundles on top of the first layer of bundles, this process is inefficient and it can be difficult to form a final stack that is square. Therefore devices known as load formers are used to partially automate this process.

A conventional load former 500 is schematically illustrated in FIGS. 18 and 19. The load former 500 includes a movable horizontal platform 502, sometimes referred to in the art as a "cookie sheet," that extends through or past a vertical stop wall 504 and that is bordered at a rear side by a vertical backstop 506. A support conveyor 508 is located below the cookie sheet 502 on a lift table 510 in a pit 512. A supply conveyor 514 brings bundles B to an operator location 516, and a take-away conveyor 518 moves finished stacks away from the load former 500.

In operation, the bundles B arrive at the operator location 516 on the supply conveyor 514, and a human operator lifts and/or slides the bundles B from the supply conveyor 514 to the cookie sheet 502. The operator then arranges the bundles B on the cookie sheet 502 to form a pattern of the bundles B that will become a layer in a stack on a pallet (not illustrated). For example, a first bundle B may be removed from the supply conveyor 514 and moved to position I on the cookie sheet 502 in contact with the stop wall 504 and the backstop 506, a second bundle II may be placed against the first bundle I and the backstop 506, a third bundle III may be placed against the first bundle I and the stop wall 504 and a fourth bundle IV may be placed against the second bundle II and the third bundle III.

With these four bundles in place, the operator presses a button (not illustrated) or otherwise generates a signal that causes a drive 520 to retract the cookie sheet 502 through or past the stop wall 504 to deposit the four bundles onto the support conveyor 508. A controller (not illustrated) causes the lift table 510 to lower the support conveyor 508 by a given amount, slightly more than the height of the layer of bundles B and re-extend the cookie sheet 502 past the stop wall 504 so that a subsequent layer of bundles can be formed thereon. When the stack on the support conveyor 508 reaches a desired height, the support conveyor 508 discharges the finished stack onto the take-away conveyor 518 and the process begins again.

Conventional load formers suffer from several shortcomings. First, in order to form a stack higher than about 48 inches, it is necessary to either place the support conveyor in a pit and/or provide a raised platform for the operator to stand on. Pits are expensive to construct and generally undesirable in manufacturing facilities. A greatly raised operator platform on the other hand, requires the incoming bundles to be raised to the level of the operator because conventional conveyors generally have a standard height such as 36 to 42 inches. Furthermore, the time required to cycle a conventional load former, that is, to retract the cookie sheet, lower the support conveyor and reextend the cookie sheet so that a subsequent layer can be formed on the cookie sheet, can be on the order of several seconds. During this time the operator is idle because the cookie sheet must be retracted, and the support conveyor must be lowered by more than the height of the layer of bundles and the cookie sheet must once again be fully extend before the operator can begin to place additional bundles on the cookie sheet. Also, no bundles can be placed on the cookie sheet during the time that a finished stack is being removed from the load former. In order to increase efficiency, it would therefore be desirable to increase the throughput of a load former and to allow the formation of tall stacks without the use of a pit or an elevated operator platform.

SUMMARY

These and other problems are addressed by the present disclosure, an aspect of which is a load former comprising a frame including a stop wall, a cookie sheet having a top surface parallel to a plane, and a first actuator configured to move the cookie sheet parallel to the plane between an extended position and a retracted position relative to the stop wall. The load former also includes a first platform shiftable between a raised position in which an upper surface of the platform is located a first distance below the plane and a lowered position in which the upper surface of the platform is located a second distance below the plane, the second distance being greater than the first distance. A second actuator moves the first platform between the raised position and the lowered position. The first platform is positioned relative to the frame such that when the cookie sheet is in the extended position a first portion of the cookie sheet directly overlies the upper surface of the platform, and when the cookie sheet in the retracted position no portion of the cookie sheet directly overlies the platform. The load former also includes a lift having a lift support and a second platform and a third actuator configured to move the second platform relative to the lift support between a raised position and a lowered position. The lift also includes a fourth actuator configured to move the second platform relative to the lift support between an extended position in which a first portion of the second platform directly overlies the first platform and a second position in which no portion of the second platform directly overlies the first platform.

BRIEF DESCRIPTION OF THE DRAWINGS

These and other aspects and features of the disclosure will be better understood after a reading of the following detailed description in connection with the attached drawings, wherein.

DETAILED DESCRIPTION

Figure 1:
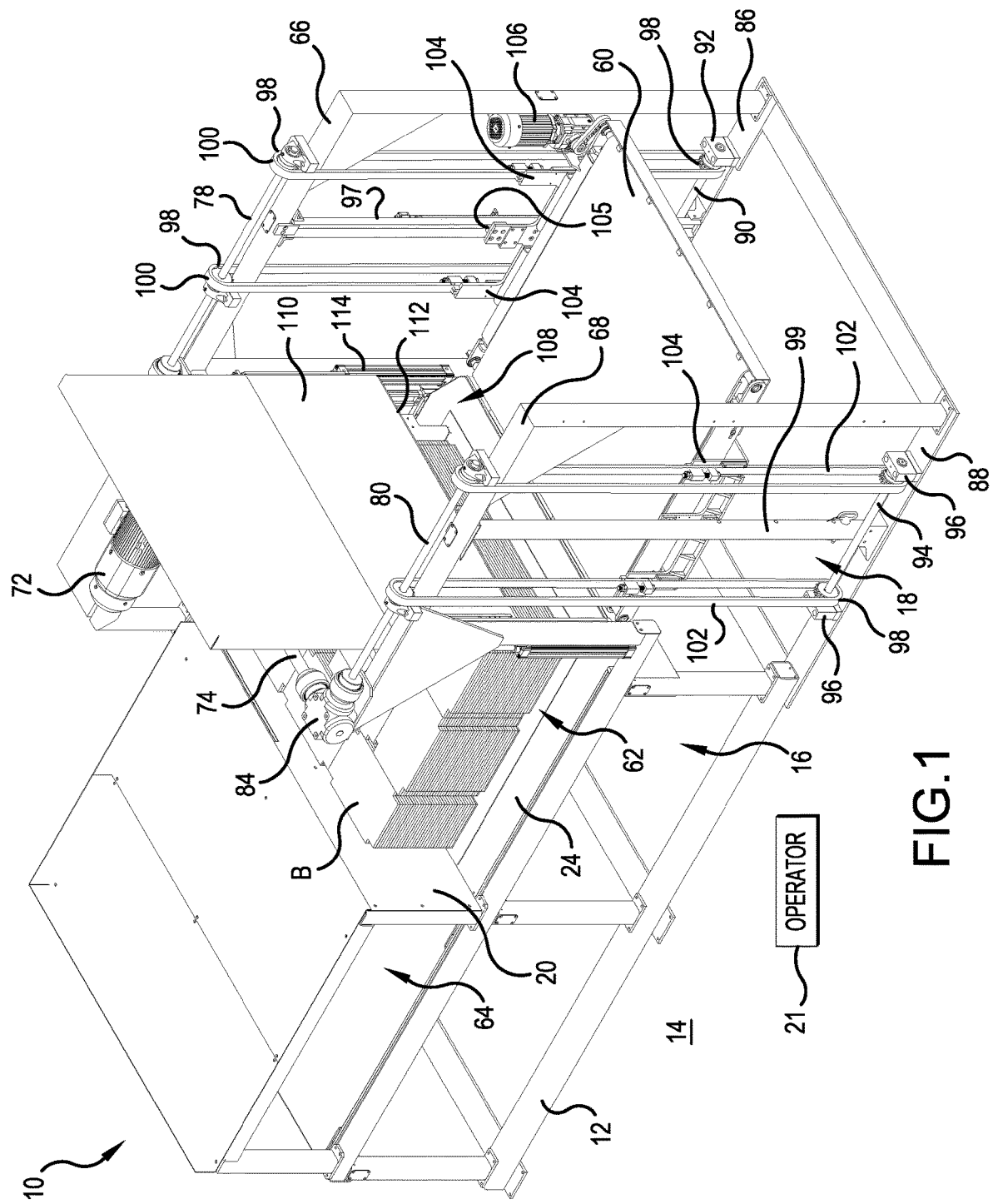
FIG. 1 is a perspective view of a load former according to a first embodiment of the present disclosure in a first configuration.
Figure 2:
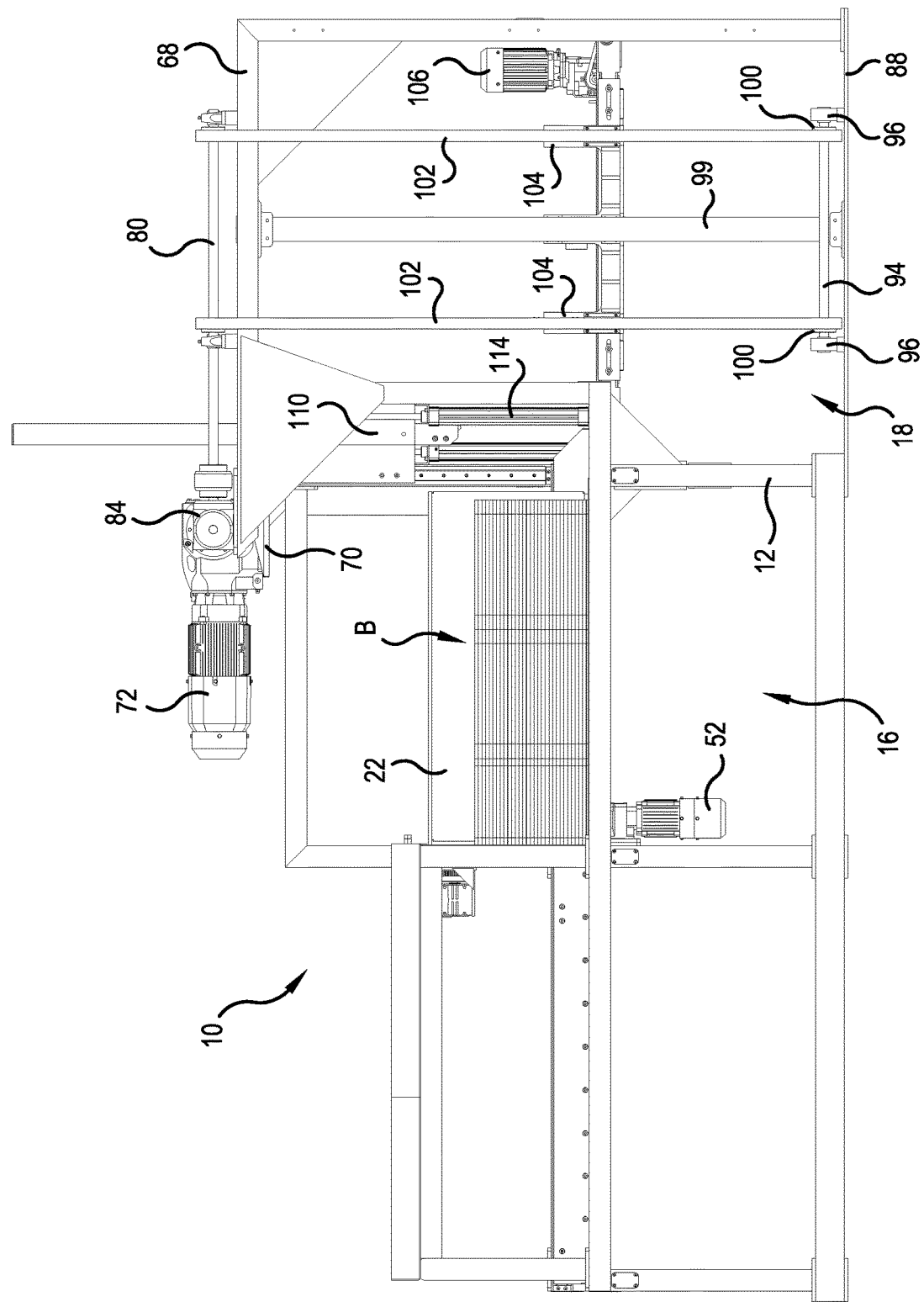
FIG. 2 is a front elevational view of the load former of FIG. 1.
Figure 3:
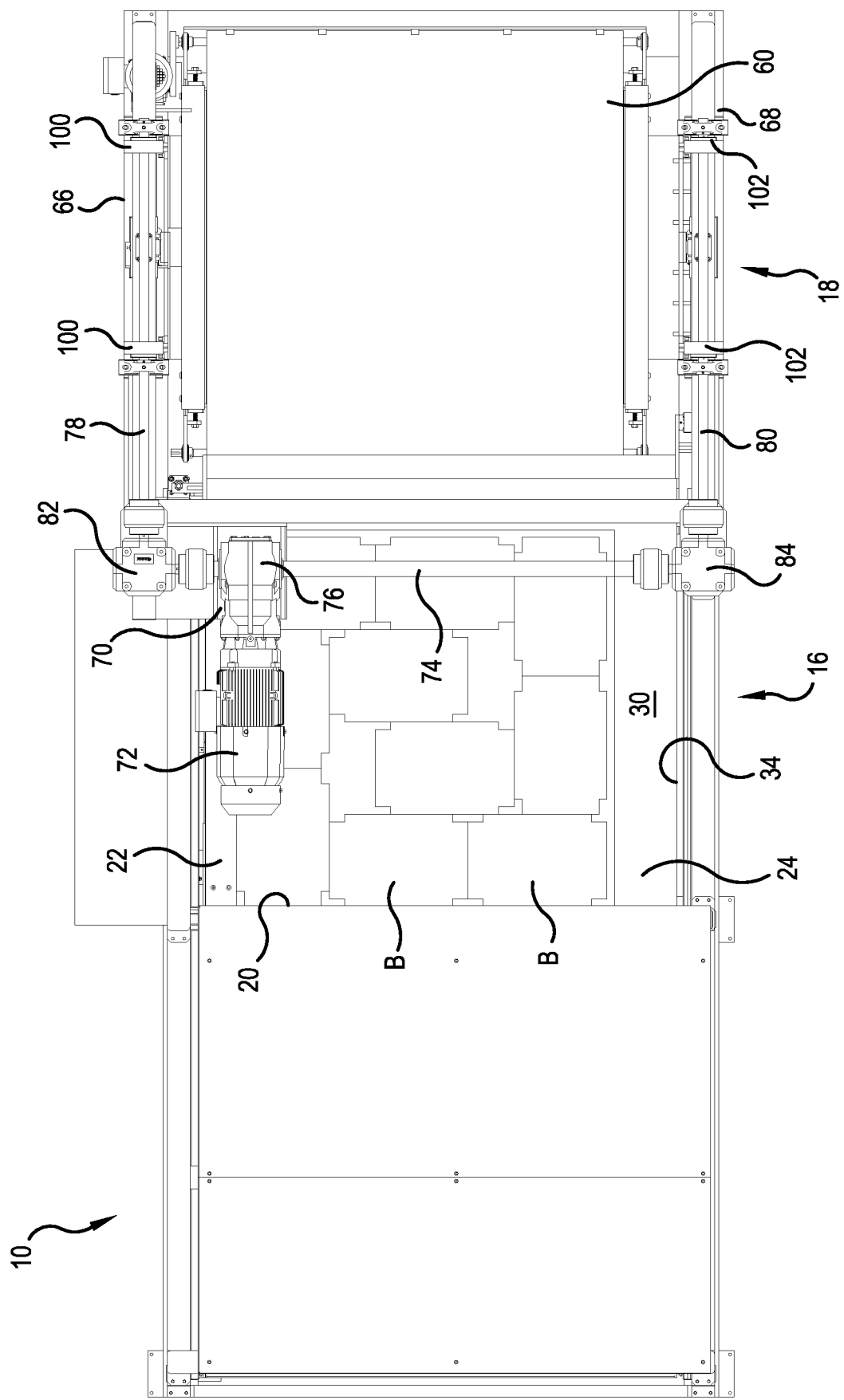
FIG. 3 is a top plan view of the load former of FIG. 1.
Figure 4:
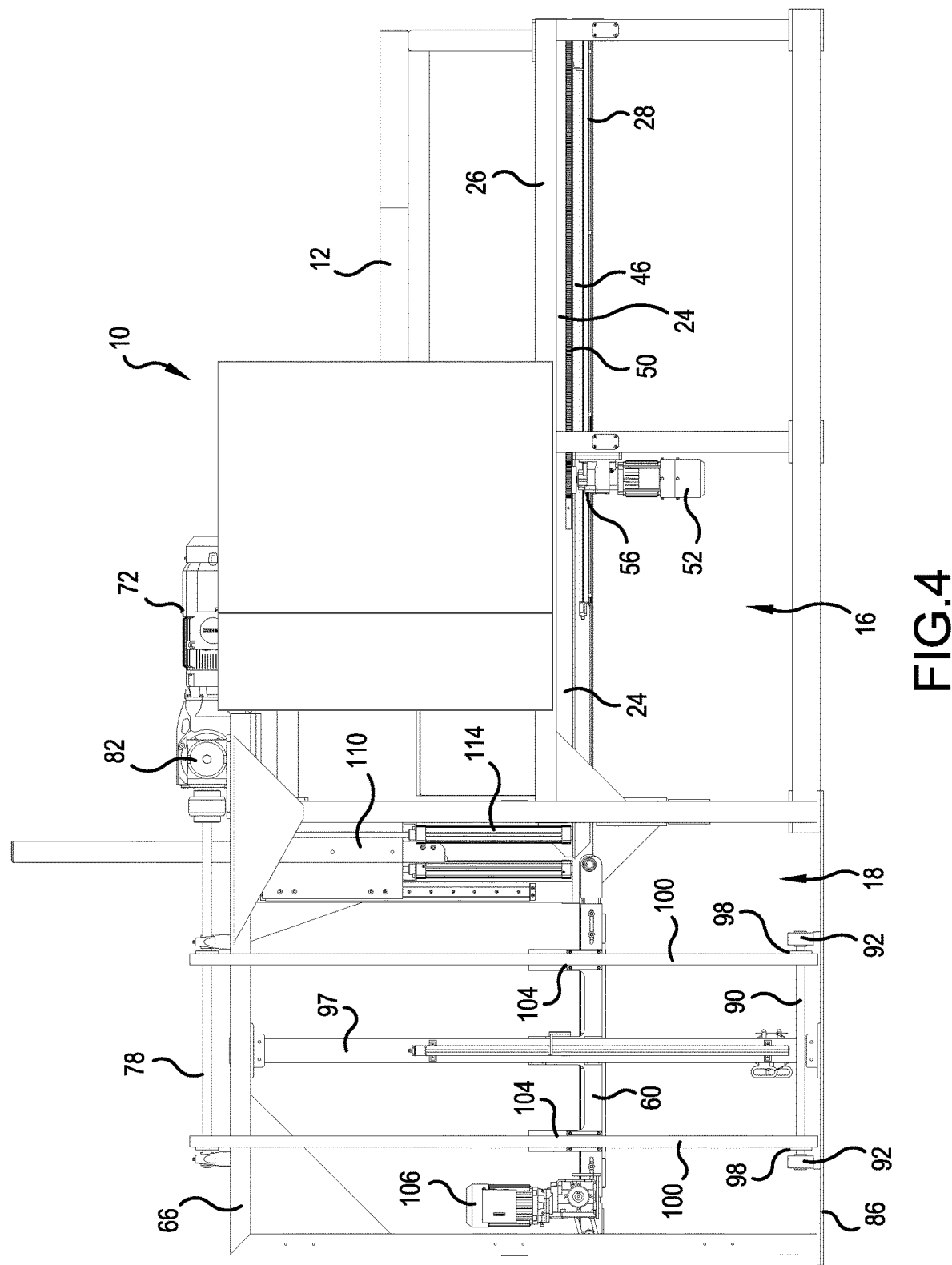
FIG. 4 is a rear elevational view of the load former of FIG. 1.

Referring now to the drawings, wherein the showings are for the purpose of illustrating embodiments of the invention only and not for the purpose of limiting same, FIGS. 1-4 show a load former 10 according to a first embodiment of the present disclosure in a first configuration. The load former 10 includes a support frame 12 configured to be mounted on a planar surface 14 such as the floor of a facility, and the frame 12 has a first portion defining a loading zone 16 and a second portion defining a stacking zone 18. The first and second portions of the frame can be formed integrally or as two discrete elements connected together.

With continued reference to FIG. 1, an operator will stand at an operator location 21 at the front side of the frame 12 directly in front of the loading zone 16, the stacking zone 18 being located to the right of the loading zone. The left-right direction of the load former may be referred to as a "longitudinal" direction and the front-rear direction may be referred to as a "transverse direction." A vertical or up-down direction is orthogonal to both the longitudinal and transverse directions and relative to the planar surface or floor 14 on which the load former 10 is supported. These relative directions are used to facilitate the description of the disclosed embodiment in connection with the attached figures but are not intended to limit the disclosure. For example, a load former could easily be constructed with the stacking zone to the left of the loading zone.

The loading zone 16 includes a stop wall 20 delimiting a left side of the loading zone 16 and a backstop 22 delimiting the rear of the loading zone. The floor of the loading zone 16 is formed by a portion of a cookie sheet 24 that is slidably supported in the frame 12 for movement in the longitudinal direction as discussed below. The cookie sheet 24 is preferably formed of a sheet steel having a coated or polished surface to minimize friction between the cookie sheet 24 and bundles B of material that will slide across the surface of the cookie sheet 24.

Figure 5:
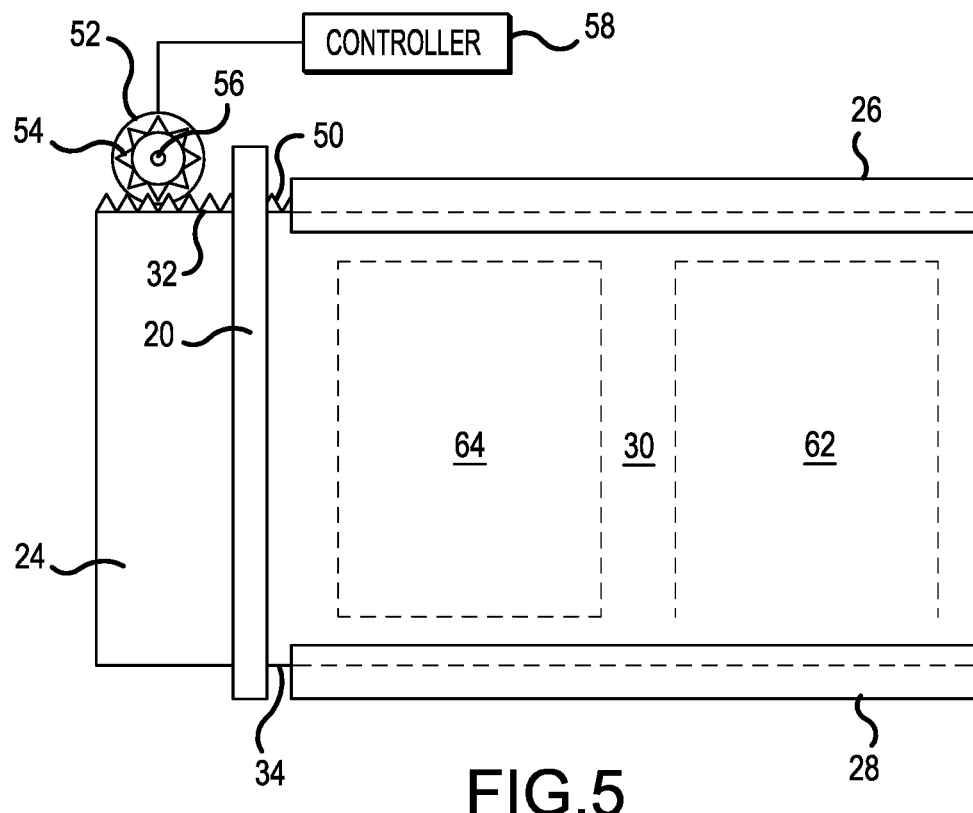
FIG. 5 is a schematic top plan view of the cookie sheet and cookie sheet drive of the load former of FIG. 1.
Figure 6:
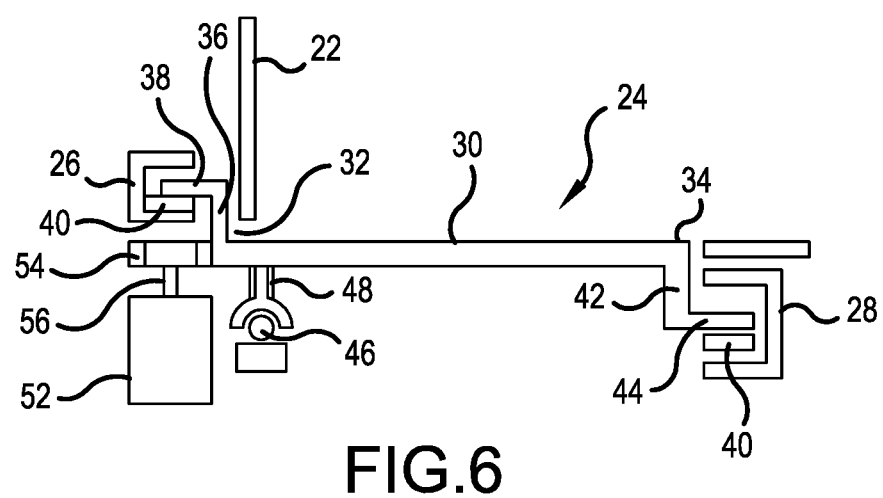
FIG. 6 is a schematic left end elevational view of the cookie sheet and cookie sheet drive of FIG. 5.

Referring now to FIGS. 5 and 6, the loading zone portion 16 of the frame 12 includes a rear channel element 26 and a front channel element 28 each having a longitudinally extending C-shaped channel facing toward a vertical center plane of the load former, and the front channel element 28 is vertically offset from the rear channel element 26. The cookie sheet 24 has a planar support portion 30 with a longitudinal rear edge 32 and a longitudinal front edge 34. A rear wall 36 projects upwardly from the longitudinal rear edge 32 and includes a horizontal rear flange 38 that extends toward the rear of the load former 10. The rear flange 38 extends into the channel in the rear channel element 26 where it is supported by roller elements 40. A front wall 42 depends from the longitudinal front edge 34 of the cookie sheet 24 and includes a front flange 44 that extends toward the front of the load former 10 and into the front channel element 28 where it is supported by additional roller elements 40. A transducer 46 is located below the planar support portion 30 of the cookie sheet 24, and a yoke 48 that depends from the bottom of the planar support portion 30 of the cookie sheet 24 is mounted for sliding movement along the transducer 46. In addition, the longitudinal rear edge 32 of the cookie sheet includes a rearward facing gear rack 50. Plain bearings (not illustrated) could be used in place of the roller elements 40.

A first motor 52 is mounted to the frame 12 and includes a pinion 54 at the end of an output shaft 56, which pinion 54 engages the gear rack 50 of the cookie sheet 24. The first motor 52 is operably connected to a controller 58, and the controller 58 controls the first motor 52 to slide the cookie sheet 24 longitudinally back and forth along the rear channel element 26 and the front channel element 28.

The stacking zone 18 includes a support platform in the form of a conveyor 60 that can be raised and lowered relative to the frame 12 in the manner discussed hereinafter.

The cookie sheet 24 is approximately twice as long (in the longitudinal direction) as conventional cookie sheets. A conventional cookie sheet has a single load forming area that is approximately as large as the area of the conveyor 60 in the stacking zone 18. A conventional cookie sheet may also include enough additional non-load forming areas to allow it to be supported and driven. The present cookie sheet 24, for reasons discussed hereinafter, has two load forming areas 62, 64, each of which is approximately as large as the area of the conveyor 60. The cookie sheet 24 is shiftable between a first position in which the first load forming area 62 is located in and forms the floor of the loading zone 16 and in which the second loading zone 64 is located to the left of the stop wall 20 and a second position in which the second loading zone 64 is located in and forms the floor of the loading zone 16 and the first load forming area 62 is located in the stacking zone 18 over the conveyor 60.

The stacking zone 18 includes a rear upper frame element 66 and a front upper frame element 68 that extend longitudinally at the rear and front sides of the stacking zone 18, respectively, and a motor support platform 70 on which a second motor 72 is provided. The second motor 72 is connected to a transverse drive shaft 74 by a first gear case 76 that includes internal gears (not illustrated) for connecting the second motor 72 to the transverse drive shaft 74. A rear drive shaft 78 is mounted on the rear upper frame element 66, and a front drive shaft 80 is mounted on the front upper frame element 68. A first end of the transverse drive shaft 74 is connected to the rear drive shaft 78 by a second gear box 82, and a second end of the transverse drive shaft 74 is connected to the front drive shaft 80 by a third gear box 84. The second gear box 82 and the third gear box 84 are configured such that the rotation of the transverse drive shaft 74 causes the front drive shaft 80 and the rear drive shaft 82 to rotate simultaneously in opposite directions.

The stacking zone 18 of the frame 12 also includes a rear lower frame element 86 located beneath and generally parallel to the rear upper frame element 66 and a front lower frame element 88 located beneath and generally parallel to the front upper frame element 68. A rear lower shaft 90 is rotatably supported by two supports 92 on the rear lower frame element 86 and a front lower shaft 94 is rotatably supported by two supports 96 on the front lower frame element 88. A pair of flanged wheels 98 is mounted on each of the rear drive shaft 78, the rear lower shaft 90, the front drive shaft 80 and the and the front lower shaft 94. A rear vertical guide track 97 extends between the rear lower frame element 86 and the rear upper frame element 66, and a front vertical guide track 99 extends between the front lower frame element 88 and the front upper frame element 68.

A pair of rear belts 100 extend between the flanged wheels 98 on the rear drive shaft 78 and the flanged wheels 98 on the rear lower shaft 90, and a pair of front belts 102 extend between the flanged wheels 98 on the front drive shaft 80 and the front lower shaft 94. Alternately, the belts 100 could be replaced with chains (not illustrated) and the flanged wheels 98 could be replaced with sprockets (not illustrated). Each of the rear belts 100 and the front belts 102 includes a connecting plate 104 that is connected to the conveyor 60 such that the conveyor will move up and down relative to the frame 12 as the belts 100, 102 move. Other drive arrangements, such as power screws or ball screws (not illustrated), could also be used to move the conveyor 60 to the frame 12. Rear and front guide elements 105 are mounted to the rear and front sides of the conveyor 60 and are received in the rear and front guide tracks 97, 99, respectively, and help ensure that the conveyor 60 moves linearly and vertically when it is raised and lowered by the belts 100, 102. The conveyor 60 also includes a third motor 106 configured to drive the conveyor 60 itself for moving a finished stack off the conveyor.

The frame 12 also includes an opening 108 (FIG. 1) between the loading zone 16 and the stacking zone 18 which opening 108 is wide enough (in the transverse direction) for the cookie sheet 24 to pass through the opening 108 and tall enough so that objects arranged on the cookie sheet 24 as part of a load to be formed can pass through the opening 108 while supported by the moving cookie sheet 24. A gate 110 is movable between a lowered location in which a bottom edge 112 of the gate is located close enough to the cookie sheet 24 to prevent bundles on the cookie sheet from passing through the opening 108 and a raised location in which the bundles on the cookie sheet can pass freely through the opening. The size of the opening and the location of the bottom edge 112 of the gate 110 are determined based on the maximum height of the bundles that are intended to be processed by the load former. For example, if the load former 10 is intended to function with layers of bundles up to 20 inches high, the bottom edge 112 of the gate 110 must be positionable at a height of more than 20 inches above the cookie sheet 24. The opening 108 may be defined by one or more elements of the frame 12 or it may merely comprise a part of the path from the load forming area 16 to the stacking area 18 along which bundles B must travel from the loading zone 16 to the stacking zone 18 which path can be selectively blocked by the gate 110.

A linear actuator 114 (FIG. 4) operably connected to the controller 58 is connected to the gate 110 for shifting the gate between the lowered and raised locations.

The operation of the load former 10 will now be described.

With reference again to FIG. 1, in a starting configuration, the cookie sheet 24 is in the first position with the first load forming area 62 of the cookie sheet 24 in the loading zone 16 and forming the floor of the loading zone 16. The stacking conveyor 60 in the stacking zone 18 is positioned such that the top surface of the conveyor 60 is substantially coplanar with or located slightly below the plane of the cookie sheet 24.

Figure 19:
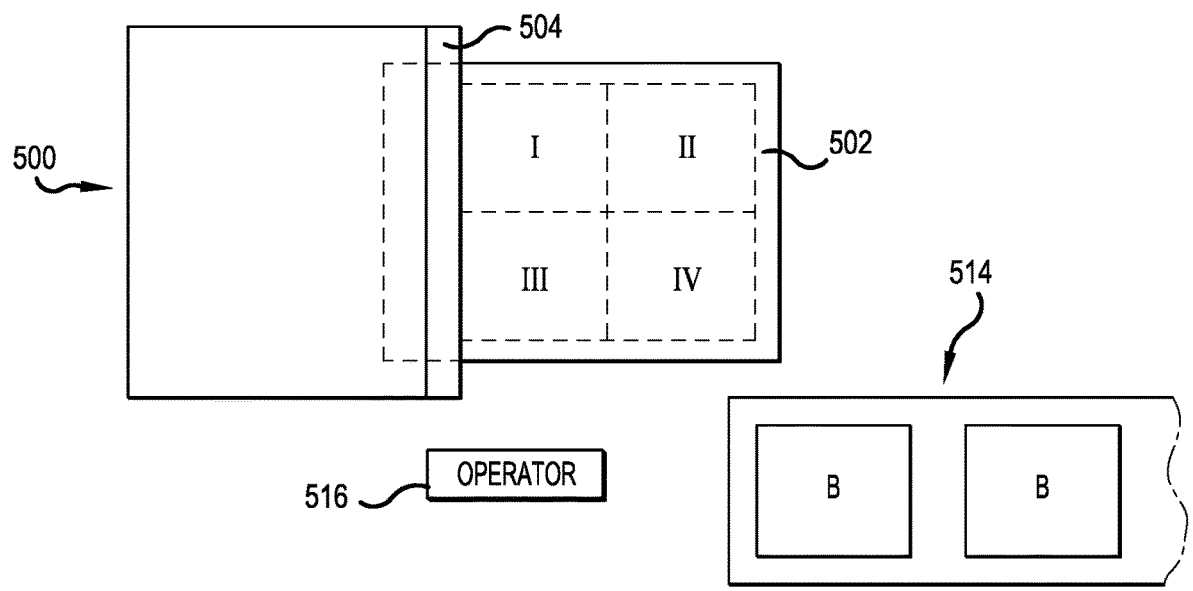
FIG. 19 is a top plan view of the conventional load former of FIG. 16.

An operator standing at an operator location 21 will receive bundles B of objects to assemble into a load from a supply conveyor (not illustrated). While the supply conveyor is not illustrated in FIG. 1, the location and operation of the supply conveyor will be understood from the depiction of a conventional supply conveyor in FIG. 19. The operator will slide a first one of the bundles B to a first position in the first load forming area 62, to a position, for example, where one side of the bundle B contacts the stop wall 20 and another side of the bundle B contacts the backstop 22. Additional bundles B will then be placed on the first load forming area 62 in a desired pattern, and the pattern will be square or rectangular because each bundle will be aligned with either the stop wall 20 or the backstop 22 or with another bundle that is already aligned with one or both of the stop wall 20 and the backstop 22.

Figure 7:
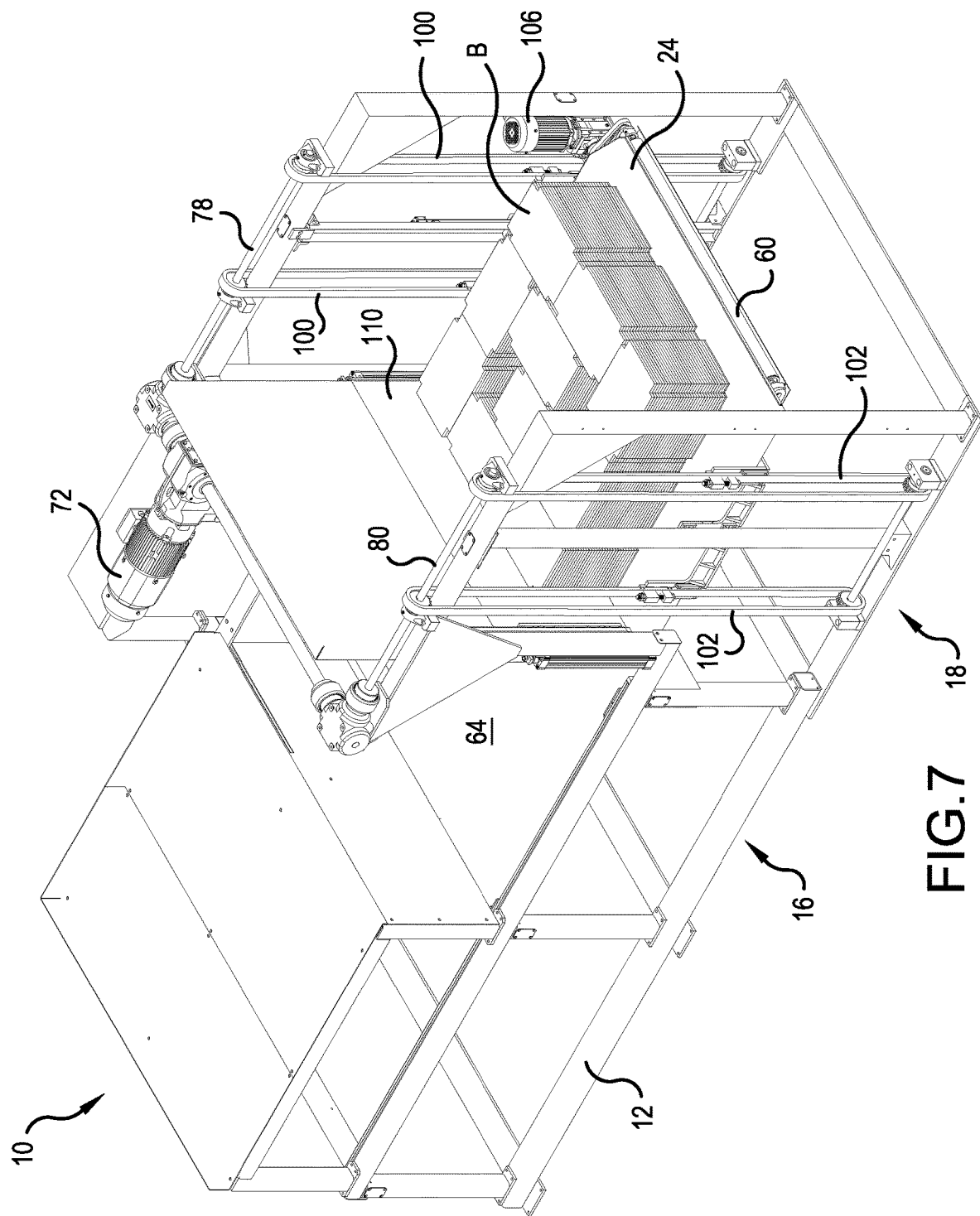
FIG. 7 is a perspective view of the load former of FIG. 1 in a second configuration.

When the pattern is complete, and with the gate 110 having previously been placed at the raised location, the controller 58 causes the first motor 56 to rotate the pinion 54 and slide the cookie sheet 24 from the first position to the second position, illustrated in FIG. 7, so that the first load forming area 62 is located in the stacking zone 18 directly over the conveyor 60 and so that the second load forming area 64 forms the floor of the loading zone 16. During this process, the cookie sheet rear flange 38 and the cookie sheet front flange 44 will slide on the roller elements 40 in the rear channel element 26 and the front channel element 28 while the yoke 48 travels along the transducer 46. The transducer 46 communicates the position of the yoke 48 and thus the position of the cookie sheet 24 to the controller 58.

Figure 8:
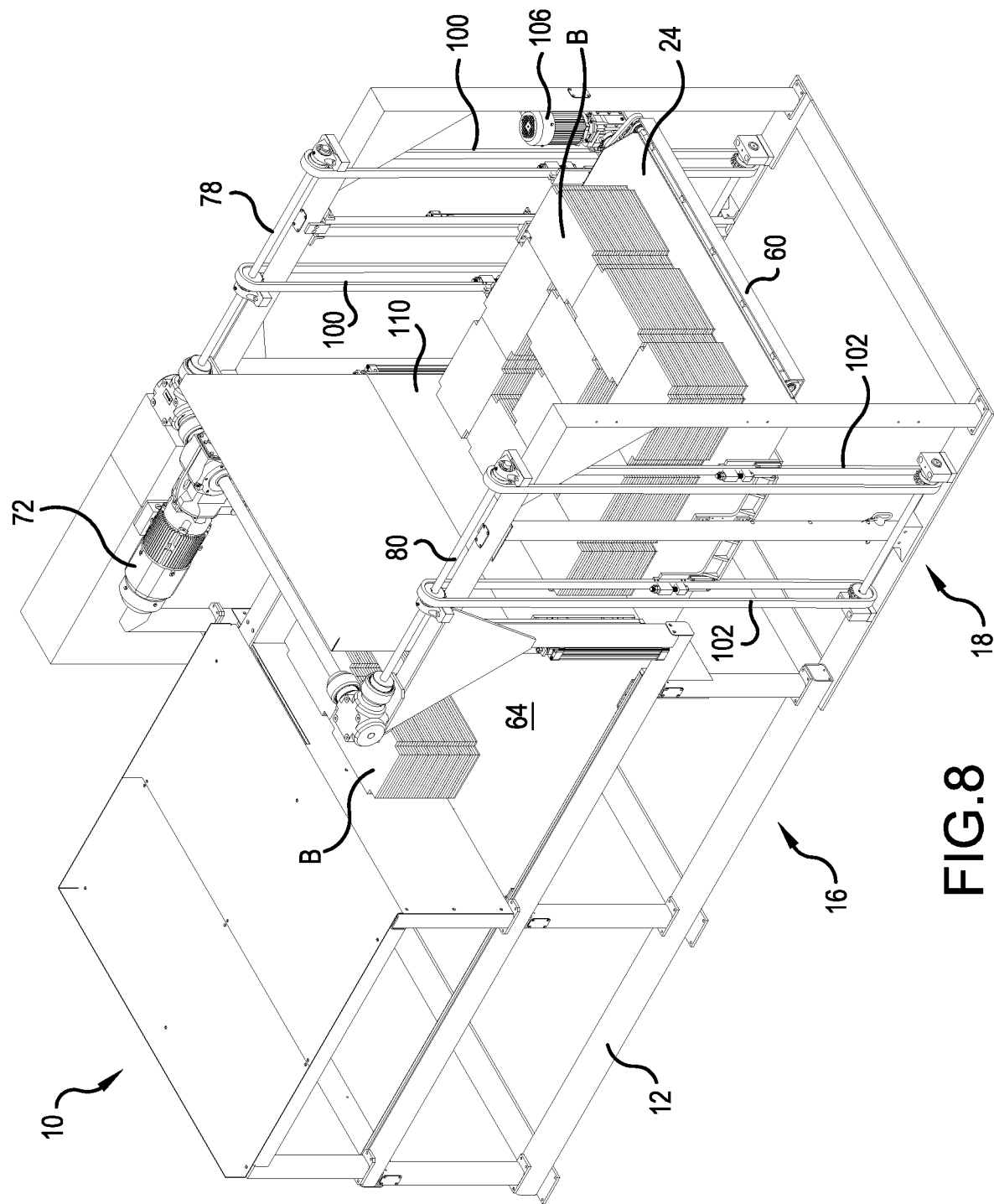
FIG. 8 is a perspective view of the load former of FIG. 1 in a third configuration.
Figure 9:
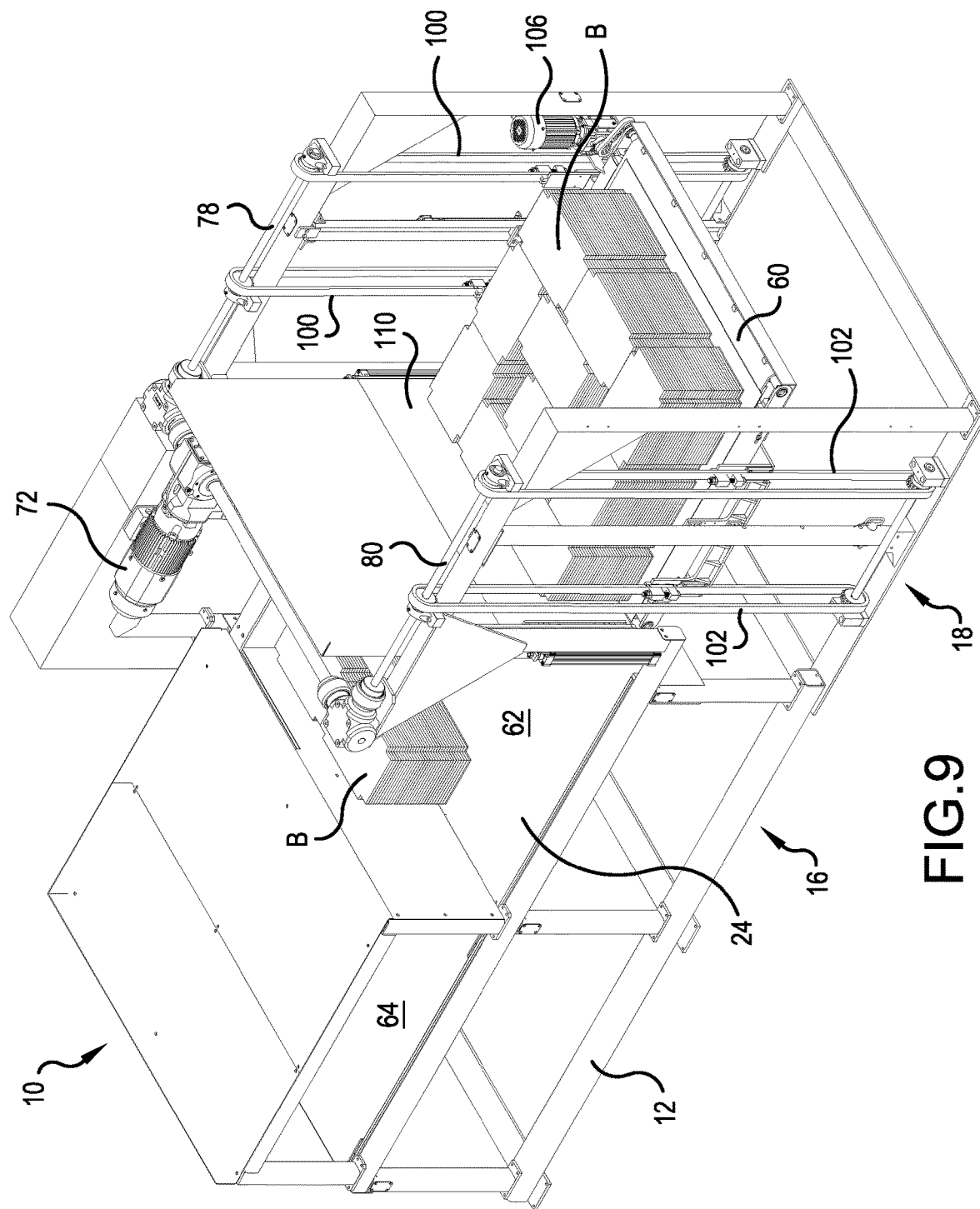
FIG. 9 is a perspective view of the load former of FIG. 1 in a fourth configuration.

When the cookie sheet 24 reaches the second position, the operator can immediately begin forming another layer of the load on the second load forming area 64 which now forms the floor of the loading zone 16. The first two bundles B of this load are shown in the second load forming area 64 in FIG. 8. As this second layer of the load is being formed, the gate 110 is lowered to the first location, and the controller 58 causes the first motor 52 to return the cookie sheet 24 to the first position. The bundles B located in the stacking zone 18 are prevented from moving toward the loading zone 16 by the gate 110 and are thus drop onto the top of the conveyor 60 as the cookie sheet 24 retracts past the gate 110. At the same time, any of the new bundles B that the operator has placed on the second load forming area 64 in the loading zone 16 maintain a constant position relative to the stop wall 20 as the cookie sheet 24 slides from right to left under the stop wall 20 and under the new bundles B. When the cookie sheet 24 returns to the first position, the new bundles are left on the first load forming area 62 which now once again forms the floor of the loading zone 16. This configuration is illustrated in FIG. 9.

In a conventional load former, the cycle time from when an operator pushes a button to cause the cookie sheet to retract, drop bundles onto the lift table and then fully re-extend can be on the order of 3-4 seconds. During this time the operator is idle and cannot begin forming the next layer on the cookie sheet. With the load former 10 of the present disclosure, as soon as the cookie sheet 24 reaches the second position, the operator can begin forming another layer of bundles on the second load forming area 64 of the cookie sheet 24. If the movement of the cookie sheet 24 from the first position to the second position is assumed to take approximately 1 second, 2 to 3 seconds are saved for each cycle of the load former 10 as compared to a conventional load former. If the total cycle time between completing each layer on the cookie sheet is about 10-12 seconds, a savings of 2 seconds per cycle represents about a 20 percent decrease in cycle time and corresponding increase in throughput.

Figure 10:
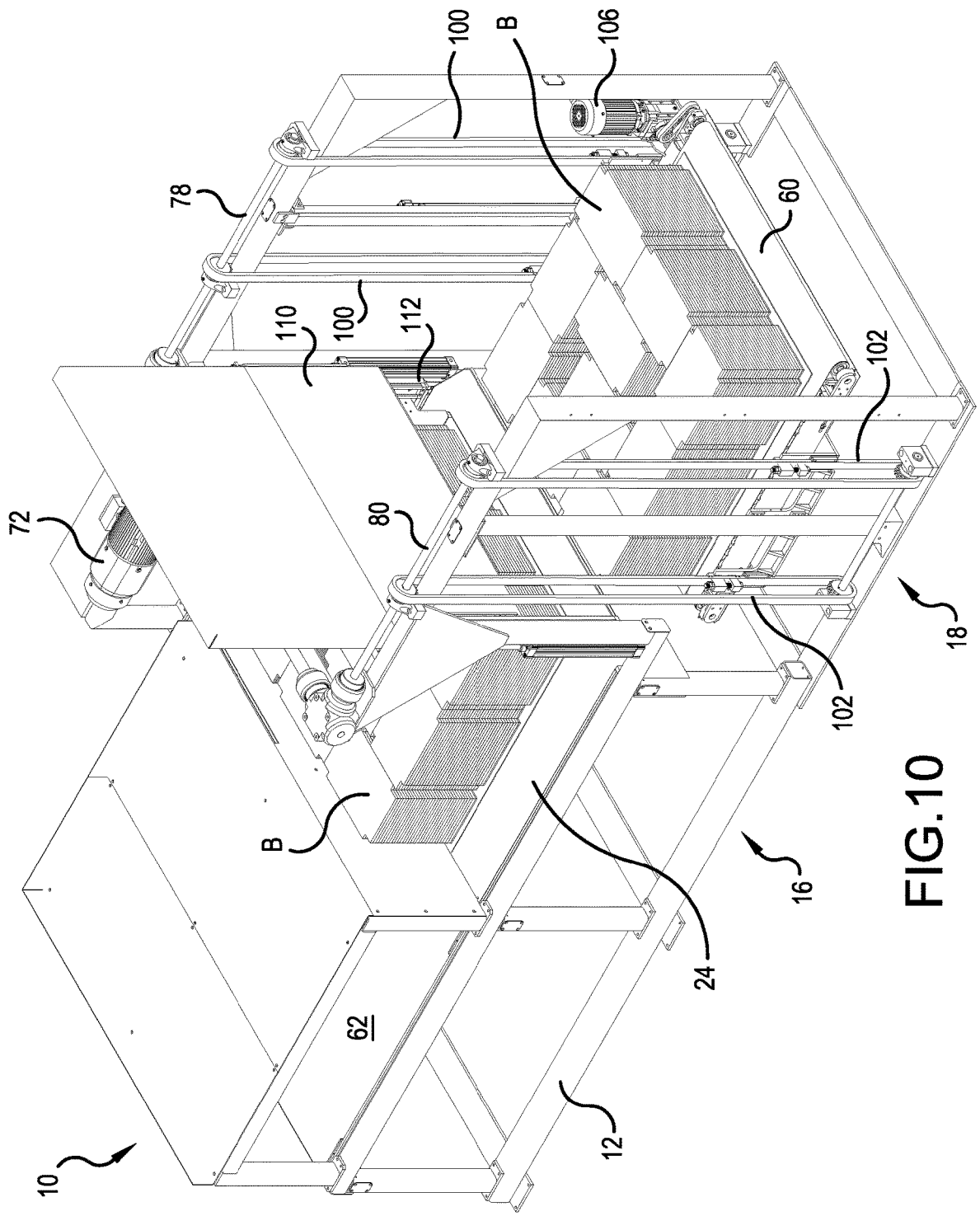
FIG. 10 is a perspective view of the load former of FIG. 1 in a fifth configuration.
Figure 11:
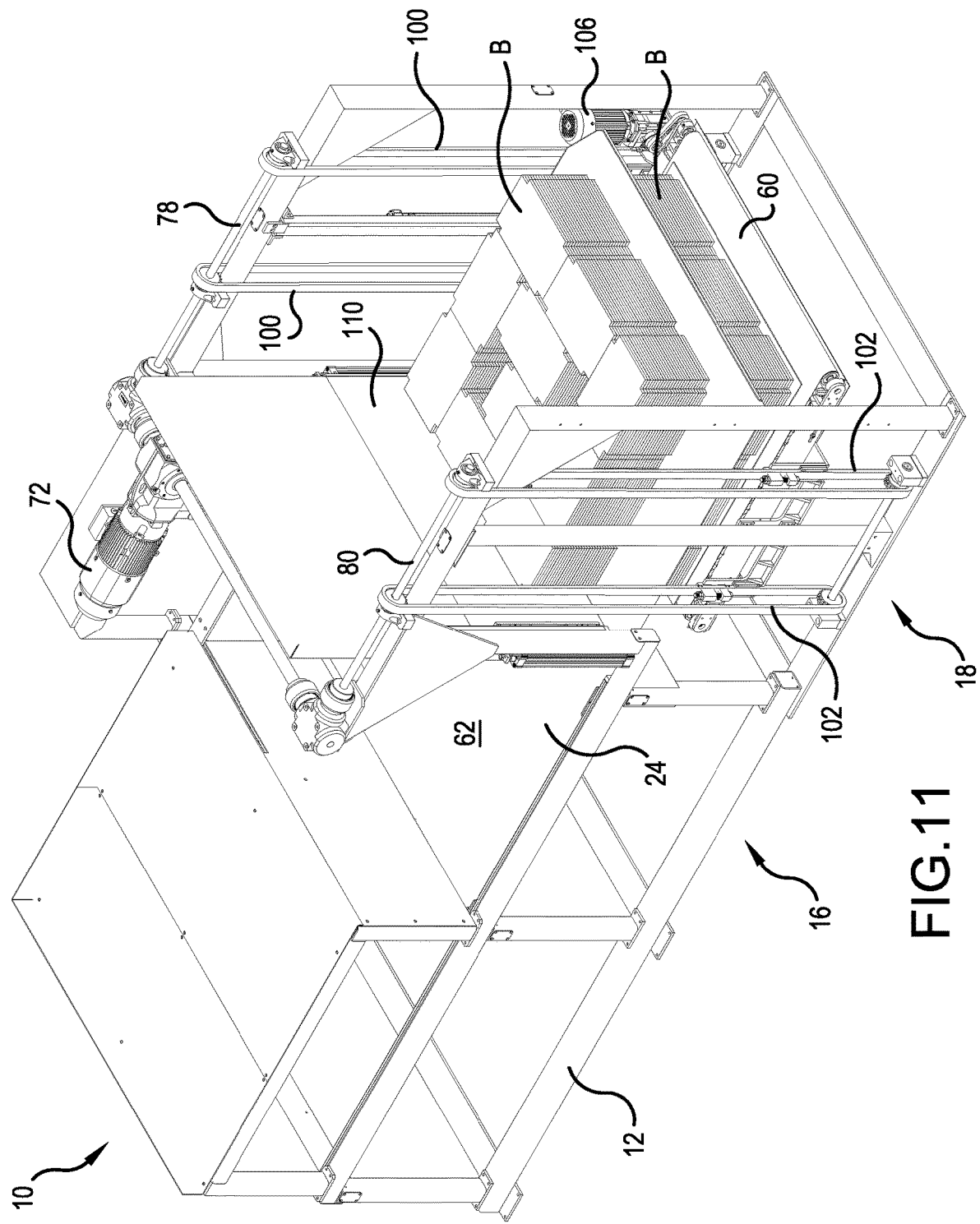
FIG. 11 is a perspective view of the load former of FIG. 1 in a sixth configuration.

While the operator continues to add bundles to the loading zone 16, the controller 58 causes the second motor 72 to rotate the transverse drive shaft 74 in a direction that rotates the rear drive shaft 78 and the front drive shaft 80 inwards toward one another to cause the innermost portions of the rear belts 100 and the front belts 102, those portions attached to the conveyor 60 by the connection plates 104, to move downwardly by an amount slightly greater than the height of the bundles on the conveyor 60 so that the cookie sheet 24 will clear the bundles on the conveyor 60 the next time it extends into the stacking zone 18. The controller 58 then causes the linear actuator 114 to raise the gate 110 to the raised location so that the opening 110 is once again present between the loading zone 16 and the stacking zone 18. This is illustrated in FIG. 10 with a full layer of bundles already present on the first load forming area 62 in the loading zone 16. FIG. 11 shows a subsequent layer of bundles deposited on top of the first layer of bundles that are already present on the conveyor 60. When the stack on the conveyor 60 has reached the desired height/desired number of layers, the controller 58 causes the conveyor 60 to operate to move the finished stack away from the load former. Then, when the finished stack is clear of the conveyor 60, the controller 58 returns the conveyor 60 to a position just below the plane of the cookie sheet 24 so that it is ready to receive the first layer of a subsequent stack of bundles.

A further embodiment of the present disclosure is illustrated in FIGS. 12-17 and includes a lift 120 configured to allow the formation of a double-height stack without the use of a pit or elevated platform. For example, if a conventional stack has a height of 48 inches, the lift 120 will allow the formation of a 96 inch tall stack. While the lift 120 will be described in connection with a load former 10' of the type illustrated in FIGS. 1-11, it will be appreciated by persons of ordinary skill in the art that such a lift 120 could also be used with a conventional load former like the one illustrated in FIGS. 18 and 19 to allow double-height stacks to be formed without the use of an extended-length cookie sheet.

The lift 120 includes a lift frame 122 having front and rear vertical supports 124 that are connected to the frame 12 of the stacking zone 18, and each of the vertical supports 124 includes a vertically extending gear rack 126. The lift 120 also has a transversely extending vertical wall 128 and front and rear horizontal supports 130 that are connected to the vertical wall 128 by front and rear side plate member 132. A first lift motor 134 is mounted to the rear side plate member 132 and includes a drive shaft 136 connected to a gear box 138. A drive shaft 140 extends through the gear box 138, transverse to the lift frame 122, and through the front and rear side plate members 132. Front and rear pinons 142 are mounted on the front and rear ends of the drive shaft 140. The front and rear pinions 142 engage the vertical racks 126 on the front and rear vertical supports 124. The first lift motor 134 is thus configured to drive the drive shaft 140 to raise and lower the lift 120 relative to the front and rear vertical supports 124 and relative to the plane of the cookie sheet 24 of the load former 10'.

Each of the front and rear horizontal supports 130 supports an inwardly facing channel 144, and a lift platform 146 is slidably mounted in the channels 144 so that it can be extended and retracted relative to the vertical wall 128. The rear longitudinally extending edge of the lift platform 146 has an upwardly facing rack gear 148. A second lift motor 150 is mounted to the rear horizontal support 130 and drives a pinion 152 that engages the rack gear 148 of the lift platform 146 so that, under the control of the controller 58, the second lift motor 150 can move the lift platform 146 between an extended position in which the lift platform 146 extends directly over the conveyor 60 of the stacking zone 18 and a second position in which no portion of the lift platform 146 directly overlies the conveyor 146 and wherein the lift platform 146 is generally contained above the footprint of the lift frame 122.

Figure 12:
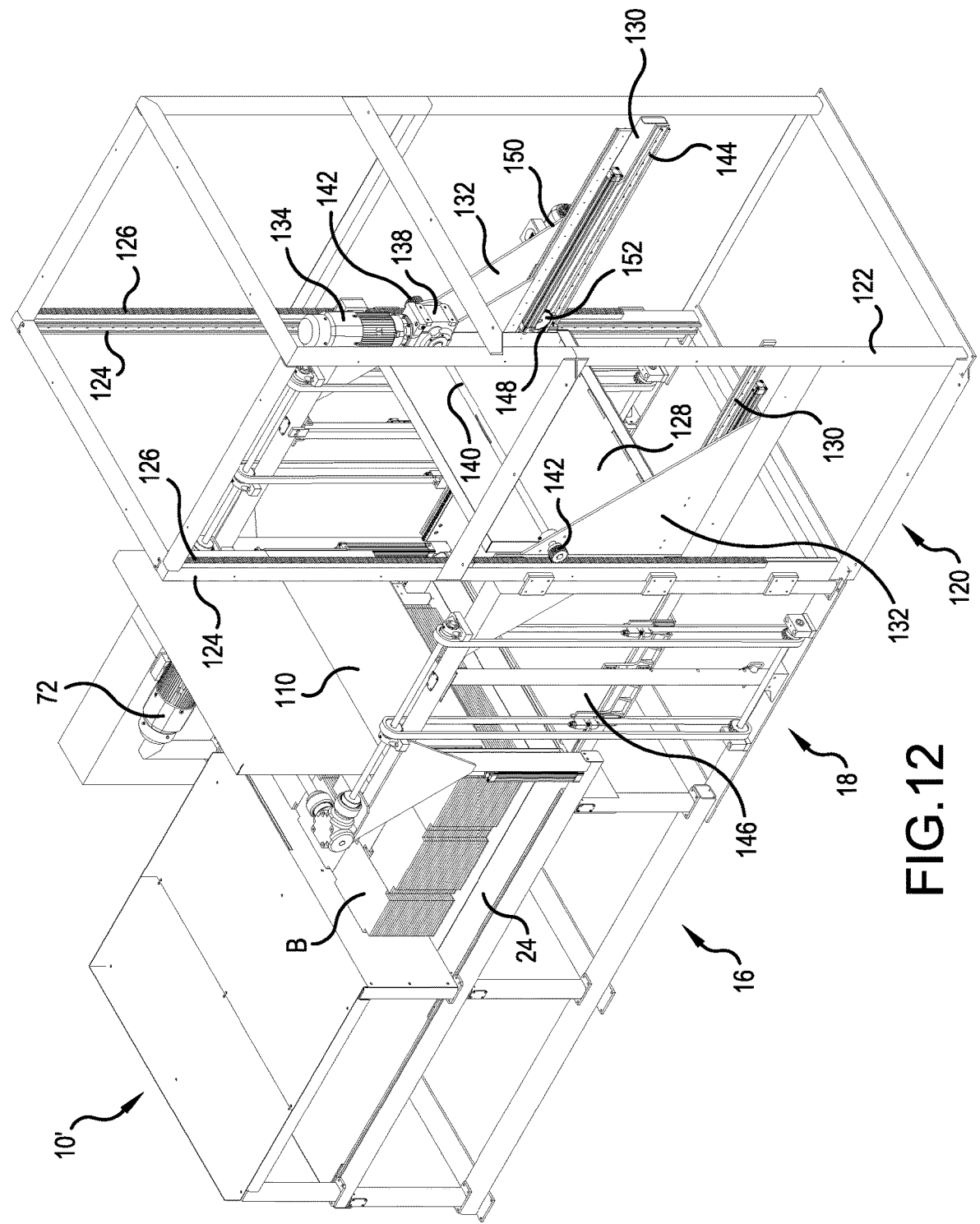
FIG. 12 is a perspective view of a load former according to a second embodiment of the present disclosure that includes a lift unit, and the lift unit is shown in a first configuration.
Figure 13:
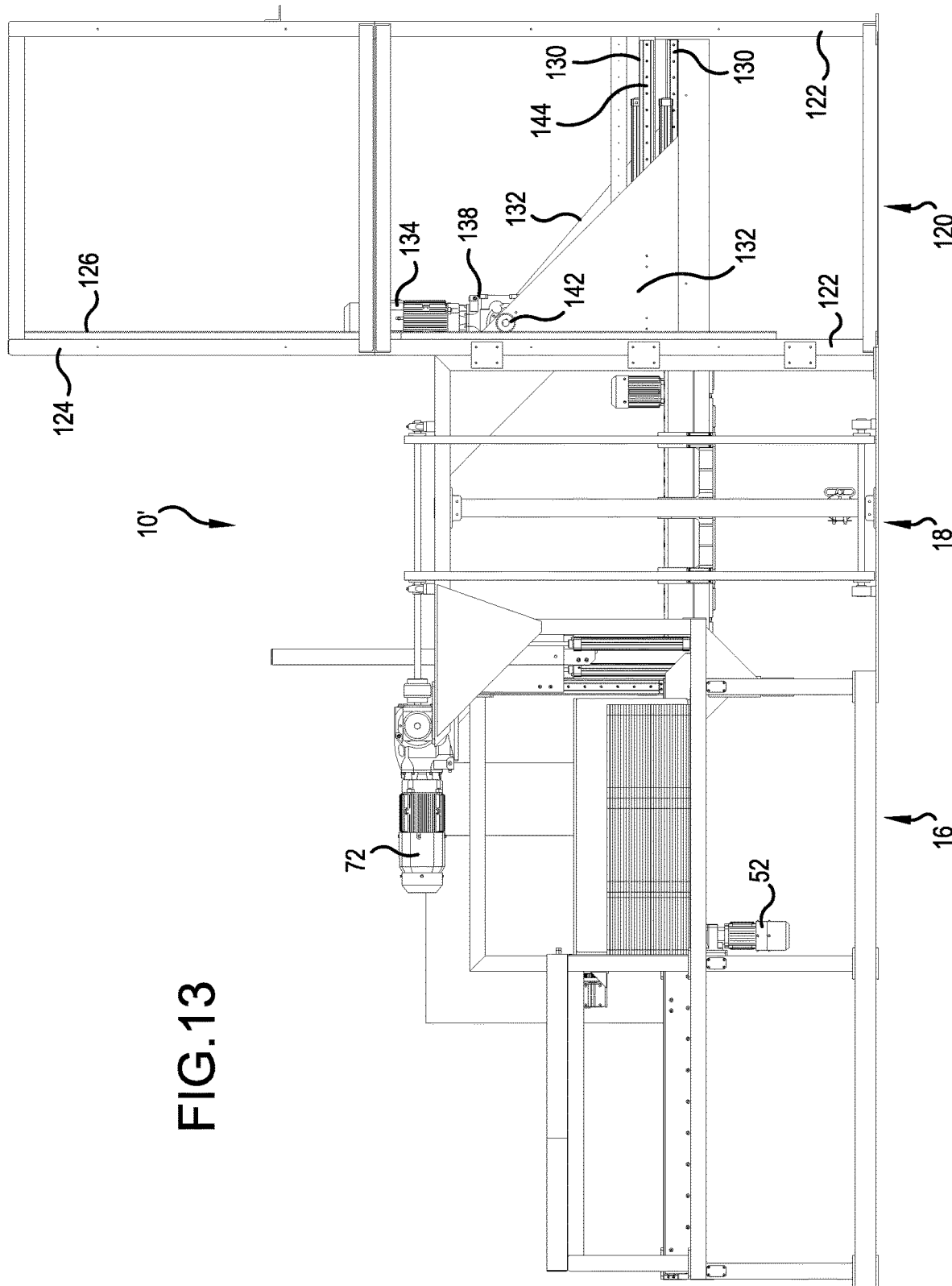
FIG. 13 is front elevational view of the load former of FIG. 12.
Figure 14:
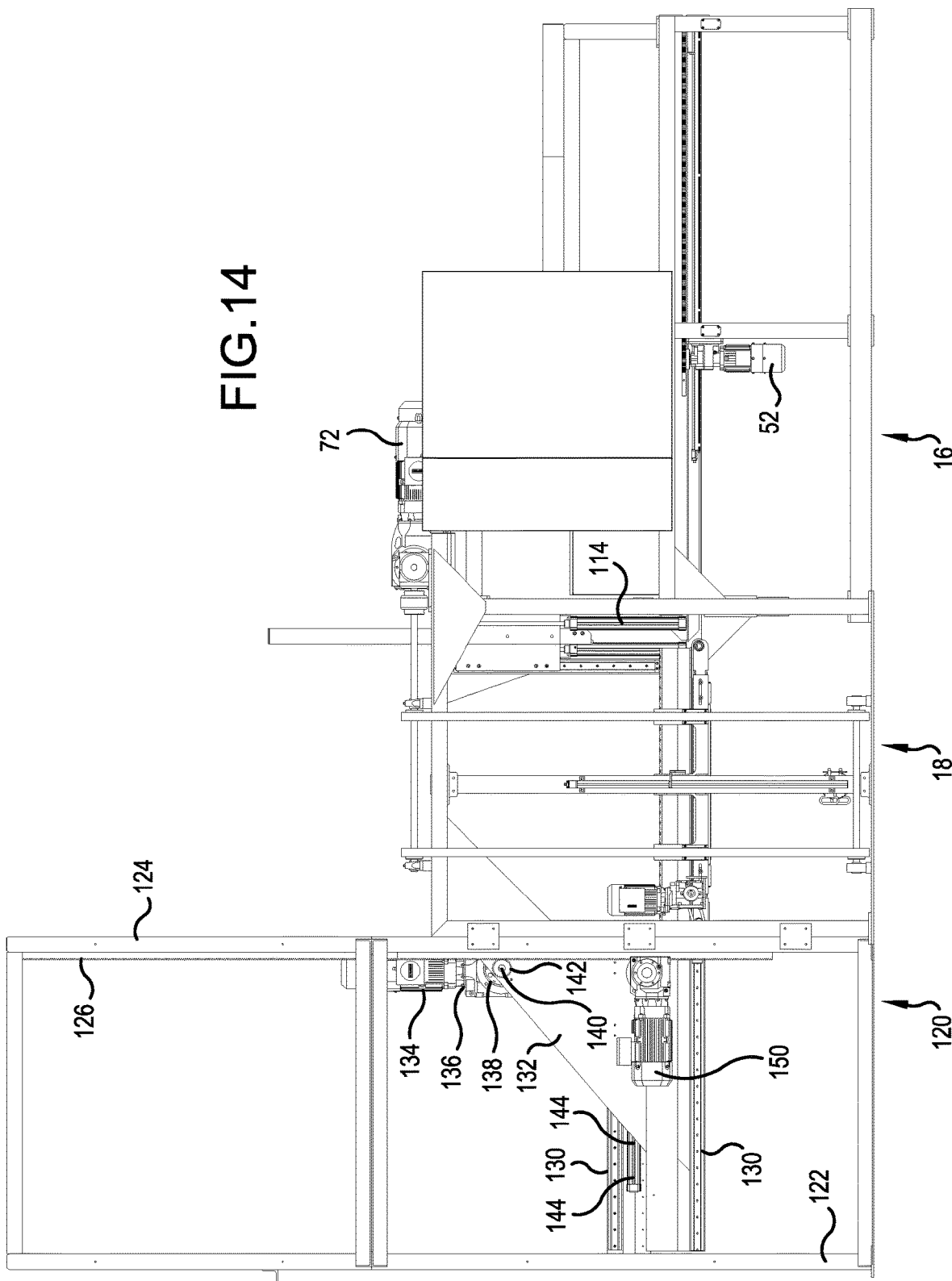
FIG. 14 is a rear elevational view of the load former of FIG. 12.
Figure 15:
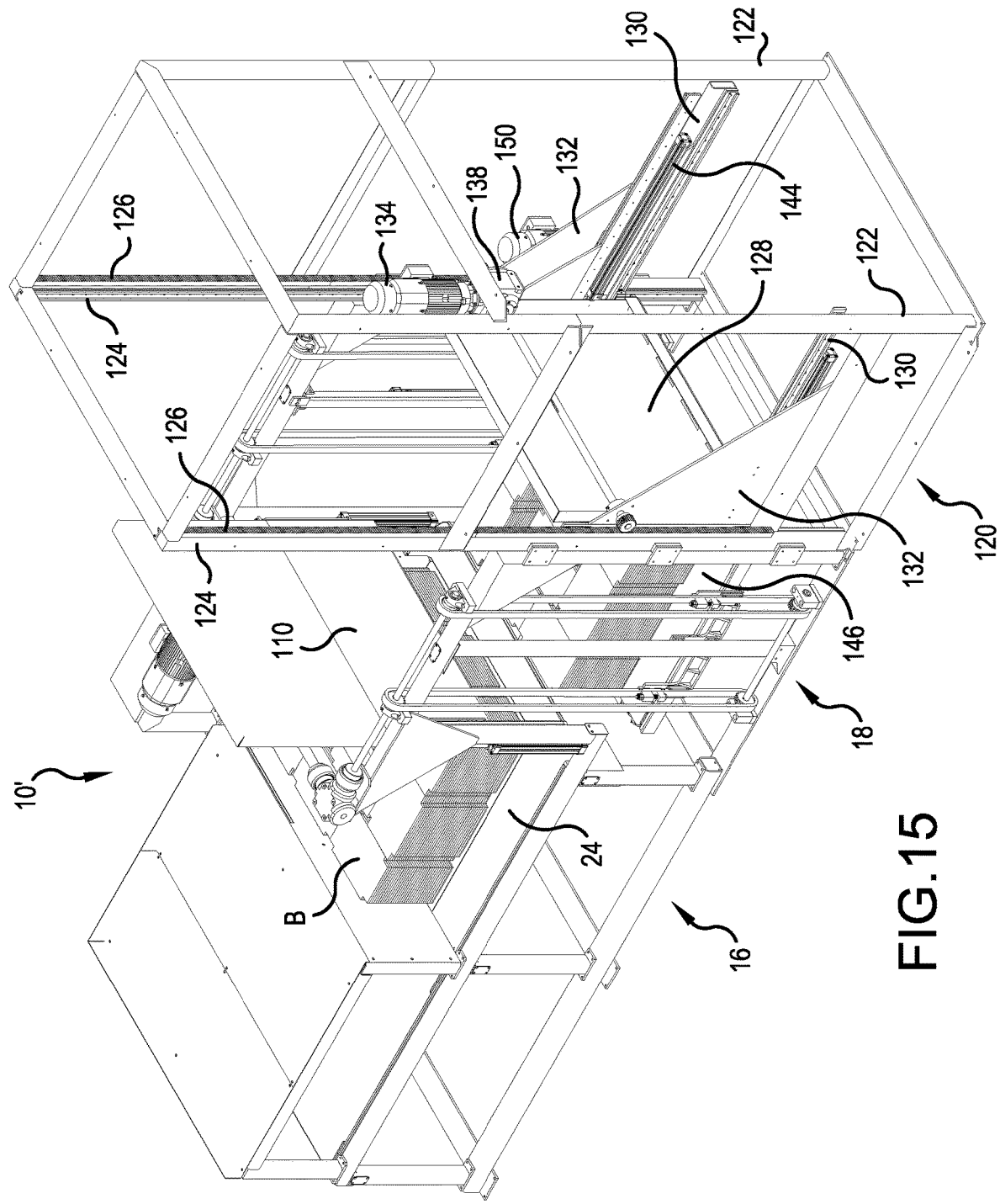
FIG. 15 is a perspective view of the load former of FIG. 12 in a second configuration.

The operation of the load former 10' having the lift 120 is generally similar to the operation of the load former 10 of the first embodiment except that, prior to moving a first layer of bundles from the loading zone 16 to the stacking zone 18, the controller 58 extends the lift platform 146 into the stacking zone 18 so that it is located on or immediately above the conveyor 60 as shown in FIGS. 12 and 13. With the lift platform 146 thus positioned, the cookie sheet 24 in the second position will directly overlie the lift platform 146. When, with the gate 110 is in the lowered location, the cookie sheet 24 retracts, it will deposit a layer of bundles onto the lift platform 146 rather than directly onto the surface of the conveyor 60. The controller 58 then controls the second motor 72 to lower the conveyor 60 relative to the plane of the cookie sheet 24 and controls the first lift motor 134 to lower the lift platform 146 relative to the plane of the cookie sheet 24 so that the tops of the first layer of bundles are located below the plane of the cookie sheet 24 and ready to receive the next layer of bundles after that next layer has been assembled in the loading zone 16. This is shown in FIG. 15.

Figure 16:
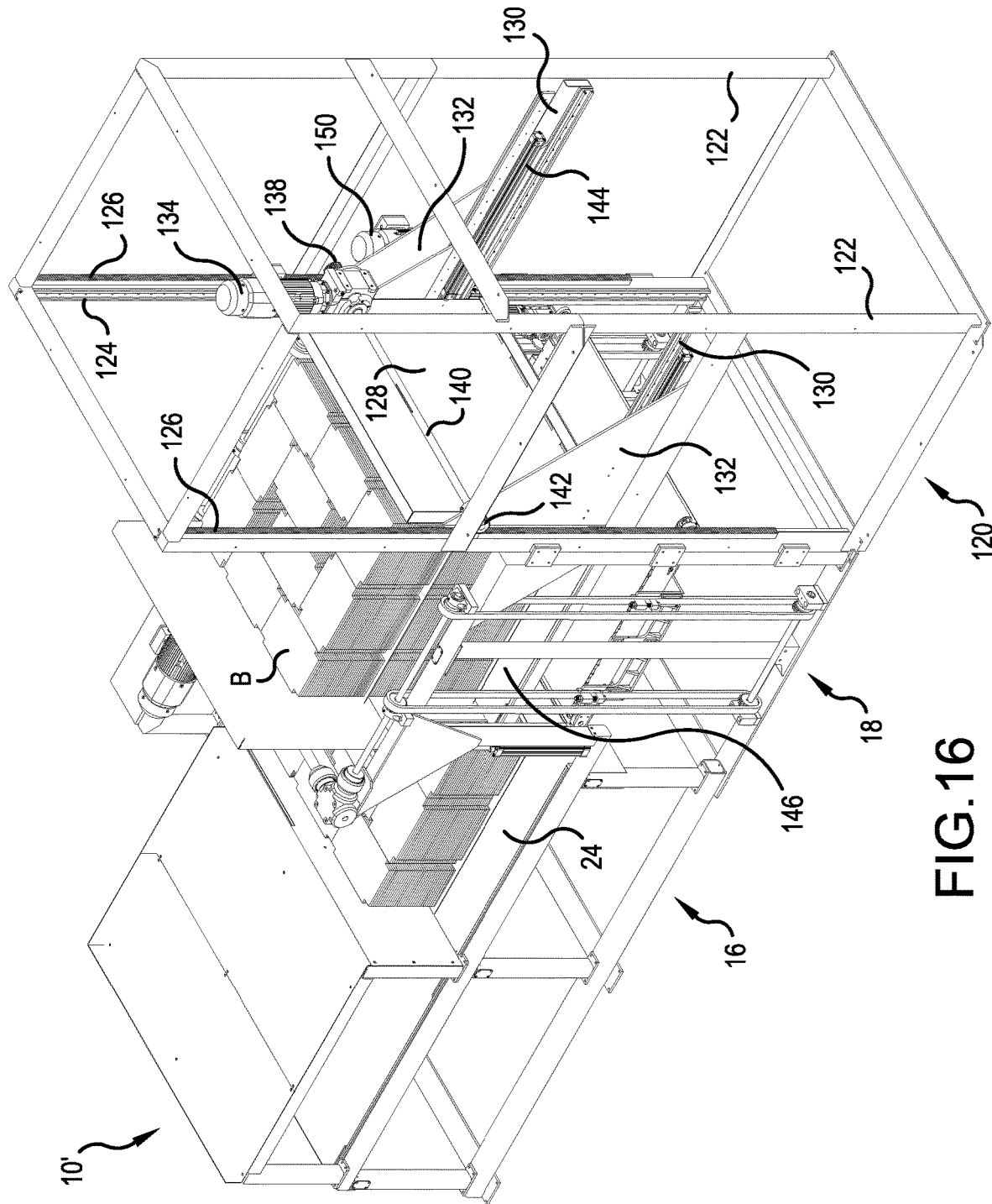
FIG. 16 is a perspective view of the load former of FIG. 12 in a third configuration.
Figure 17:
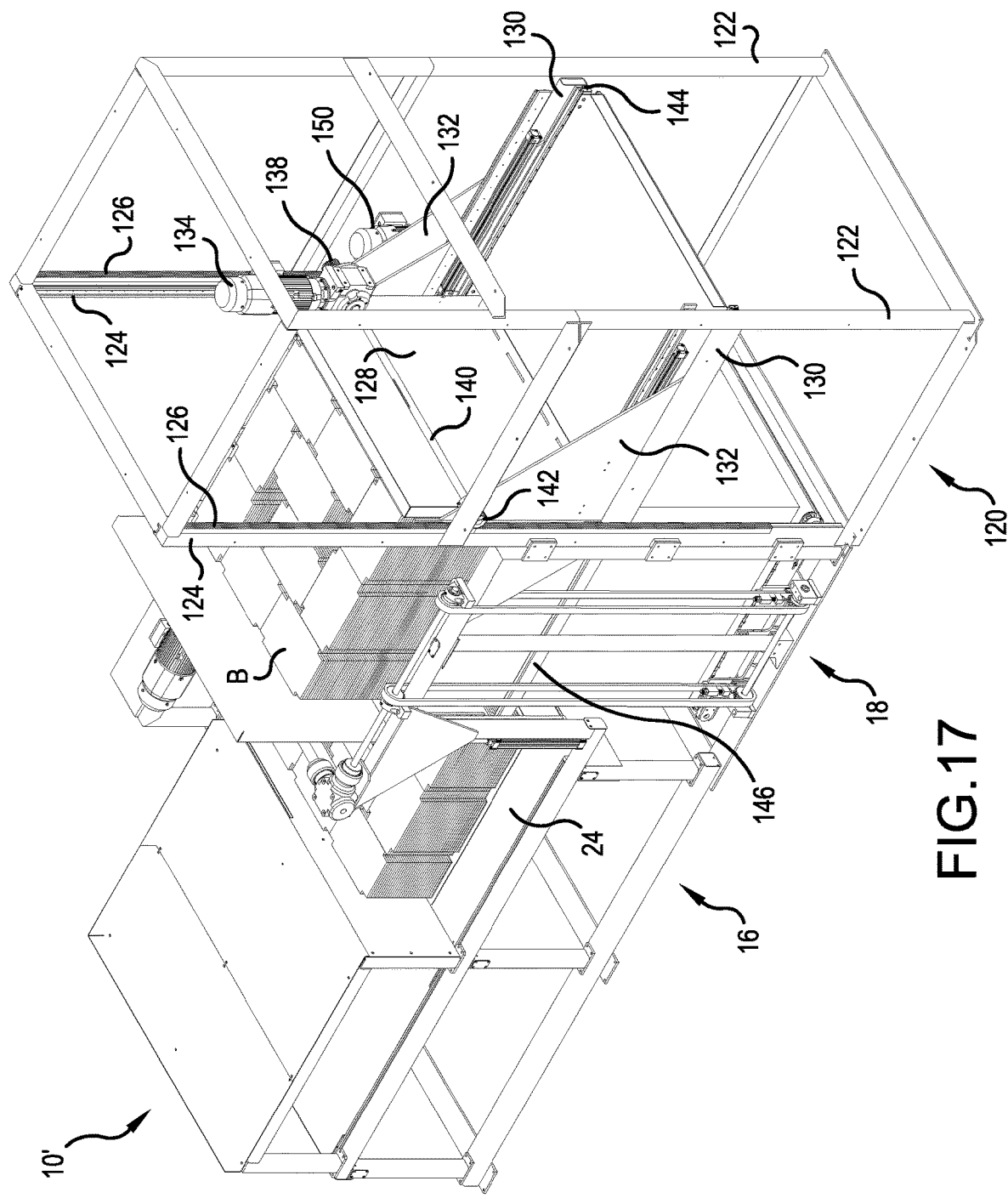
FIG. 17 is a perspective view of the load former of FIG. 12 in a fourth configuration.
Figure 18:
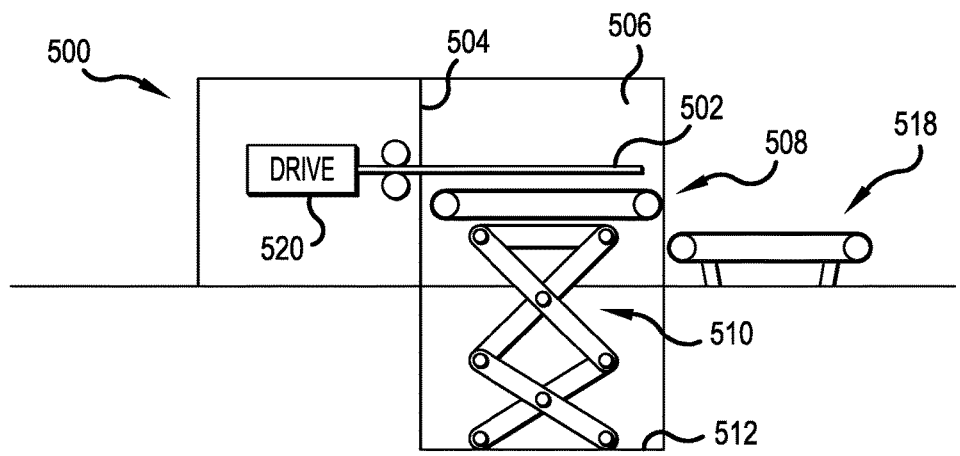
FIG. 18 is a schematic side elevational view of a conventional load former.

When a stack having a convention height such as 48 inches has been formed on the conveyor 60, instead of moving that stack away from the stacking zone 18 for further processing, the controller 58 causes the first lift motor 134 to raise the lift platform 146 to the position shown in FIG. 16. In this raised position, the entire lift platform 146 is located sufficiently far above the plane of the cookie sheet 24 that the conveyor 60 can be placed immediately below the plane of the cookie sheet 24 and a second stack of bundles can be formed on the conveyor 60 as described in the first embodiment. When the second stack of bundles on the conveyor 60 has reached a final height, the controller 58 controls the first lift motor 134 to lower the lift platform 146 to a location just above the stack of bundles on the conveyor and controls the second lift motor 150 to retract the lift platform relative to the vertical wall 128 as shown in FIG. 17. Because movement of the bundles on the lift platform 146 is blocked by the vertical wall 128, the first stack of bundles on the lift platform slides off the lift platform 146 and onto the top of the second stack of bundles that is present on the conveyor 60. The double-height stack is then moved off the conveyor 60 for further processing. In this manner, a double-height stack of bundles can be formed without a pit and without providing the operator with a platform that allows him to reach the top of, e.g., a 96 inch tall stack.

The present invention has been described herein in terms of presently preferred embodiments. However, additions and modifications to these embodiments will become apparent to persons of ordinary skill in the art upon a reading of the foregoing detailed description in connection with the attached drawings. It is intended that all such modifications and additions for a part of the present invention to the extent they fall within the scope of the claims appended hereto.

What is claimed is:

1. A load former comprising:
   a frame including a stop wall;
   a cookie sheet having a top surface parallel to a plane;
   a first actuator configured to move the cookie sheet parallel to the plane between an extended position and a retracted position relative to a first platform,
   the first platform being shiftable between a raised position in which an upper surface of the platform is located a first distance below the plane and a lowered position in which the upper surface of the platform is located a second distance below the plane, the second distance being greater than the first distance,
   a second actuator configured to move the first platform between the raised position and the lowered position;
   the first platform being positioned relative to the frame such that when the cookie sheet is in the extended position a first portion of the cookie sheet directly overlies the upper surface of the platform and when the cookie sheet in the retracted position no portion of the cookie sheet directly overlies the platform,
   a lift having a lift support and a second platform;
   a third actuator configured to move the second platform relative to the lift support between a raised position and a lowered position and a fourth actuator configured to move the second platform relative to the lift support between an extended position in which a first portion of the second platform directly overlies the first platform and a second position in which no portion of the second platform directly overlies the first platform.

2. The load former according to claim 1, wherein the second platform is movable from a first position below the plane to a second position above the plane.

3. The load former according to claim 1, wherein the first platform comprises a conveyor.

4. The load former according to claim 1,
   including a load zone comprising a first imaginary, vertical, column bounded on a first side by the stop wall and a stacking zone comprising a second imaginary vertical column adjacent to the load zone and not overlapping the load zone,
   wherein when the cookie sheet is in the extended position a first portion of the cookie sheet is located in the stacking zone.

5. The load former according to claim 4, wherein when the cookie sheet is in the retracted position, the first portion of the cookie sheet is located in the load zone.

6. The load former according to claim 1, wherein the stop wall comprises a gate shiftable between a first location and a second location relative to the plane.

7. A method of operating the load former according to claim 1, comprising:
   placing the cookie sheet in the extended position;
   placing the second platform in the extended position directly under the extended cookie sheet and directly over the first platform;
   arranging a first set of a plurality of objects on the cookie sheet along the stop wall, each of the objects having a height;
   retracting the cookie sheet to deposit the first set of the plurality of objects onto the second platform;
   lowering the second platform such that top surfaces of the first set of the plurality of objects are below the plane;
   extending the cookie sheet over the first plurality of objects;
   arranging a second set of the plurality of objects on the cookie sheet;
   retracting the cooking sheet to deposit the second set of the plurality of objects onto the first set of the plurality of objects;
   raising the second platform to a position such that a bottom of the second platform is located above the plane by a distance greater than the height;
   extending the cookie sheet;
   raising the first platform to a position directly below the cookie sheet;
   arranging a third set of the plurality of objects on the cookie sheet;
   retracting the cooking sheet to deposit the third set of the plurality of objects onto the first platform;
   lowering the first platform;
   extending the cookie sheet over the third set of the plurality of objects;
   arranging a fourth set of the plurality of objects on the cookie sheet;
   retracting the cookie sheet to deposit the fourth set of the plurality of objects onto the third set of the plurality of objects;
   lowering the second platform so that bottoms of the first set of the plurality of objects are located directly above tops of the fourth set of the plurality of objects; and
   retracting the second platform to deposit the first and second sets of the plurality of objects onto the top of the fourth set of the plurality of objects.

8. The method according to claim 7,
   wherein the load former includes a load zone comprising a first imaginary, vertical, column bounded on a first side by the stop wall and a stacking zone comprising a second imaginary vertical column substantially overlapping the load zone.

9. The method according to claim 7,
   wherein the load former includes a load zone comprising a first imaginary, vertical, column bounded on a first side by the stop wall and a stacking zone comprising a second imaginary vertical column adjacent to the load zone and not overlapping the load zone.

* * * * *